(12) United States Patent
Heckmann et al.

(10) Patent No.: US 6,737,376 B1
(45) Date of Patent: May 18, 2004

(54) POROUS CERAMIC

(75) Inventors: Klaus Heckmann, Pettendorf (DE); Thomas Wenger, Heltzerstrasse 10, D-93049 Regensburg (DE)

(73) Assignee: Thomas Wenger, Regensburg (DE)

( * ) Notice: Subject to any disclaimer, the term of this patent is extended or adjusted under 35 U.S.C. 154(b) by 0 days.

(21) Appl. No.: 09/743,244

(22) PCT Filed: Jul. 9, 1999

(86) PCT No.: PCT/EP99/04841
§ 371 (c)(1),
(2), (4) Date: Jun. 8, 2001

(87) PCT Pub. No.: WO00/02830
PCT Pub. Date: Jan. 20, 2000

(30) Foreign Application Priority Data

Jul. 9, 1998 (DE) .......................................... 198 30 795

(51) Int. Cl.⁷ .......................... C04B 35/10; C04B 35/48
(52) U.S. Cl. .......................... 501/80; 501/12; 501/103; 501/127; 423/608; 423/610; 423/624; 423/625
(58) Field of Search .......................... 501/80, 12, 103, 501/127, 85; 423/608, 610, 624, 625

(56) References Cited

U.S. PATENT DOCUMENTS

| | | | |
|---|---|---|---|
| 3,565,259 A | | 2/1971 | Meyer-Berge et al. ...... 210/500 |
| 5,227,342 A | * | 7/1993 | Anderson et al. ............. 501/12 |
| 5,399,535 A | * | 3/1995 | Whitman ...................... 501/80 |
| 5,439,624 A | * | 8/1995 | Anderson et al. ............. 501/80 |
| 5,610,109 A | * | 3/1997 | Anderson et al. ............. 501/80 |
| 5,962,352 A | * | 10/1999 | Kweon et al. ................. 501/12 |
| 5,998,317 A | * | 12/1999 | Sterzel ......................... 501/80 |
| 6,228,340 B1 | * | 5/2001 | Imhof et al. ................. 423/338 |
| 6,235,665 B1 | * | 5/2001 | Pickrell et al. ................. 501/9 |
| 6,368,703 B1 | * | 4/2002 | Johnson .................... 428/316.6 |
| 6,399,528 B1 | * | 6/2002 | Krell et al. .................... 501/80 |

FOREIGN PATENT DOCUMENTS

| | | |
|---|---|---|
| EP | 0 479 553 A1 | 10/1991 |
| GB | 1037502 | 7/1966 |

OTHER PUBLICATIONS

P. Layrolle, et al.; "Sol–Gel synthesis of Amorphous Calcium Phosphate and Sintering into Microporous Hydroxyapatite Bioceramics"; J. American Ceramic Society; pp. 1421–1428; 81; (1998).

H.J. Purz; "Morphological Investigations of Ordered Gel Formation in Polyelectrolytes"; Inst. of Polymer Chemistry of the German Academy of Science; XP–002,122,083.

* cited by examiner

*Primary Examiner*—Paul Marcantoni
(74) *Attorney, Agent, or Firm*—Peter F. Corless; John B. Alexander; Edwards & Angell, LLP

(57) ABSTRACT

Porous ceramics are described, which are produced by
a) mixing an aqueous solution of a suitable ionotropically orientable polyanion, either with
   oxides, hydroxides or hydrated oxides, which are present in the form of a sol, of the metals Al, Zr, Ti and Nb,
   or with finely crystalline oxides, hydroxides or hydrated oxides, which are present in suspension, of these metals,
   or with finely crystalline tricalcium phosphate or apatite which are present in suspension,
b) bringing the mixed sol obtained as in a) or the suspension obtained as in a) into contact with a solution of a salt of a di- or trivalent metal cation in order to produce an ionotropic gel body,
c) compacting the gel body by introducing it into electrolyte solutions which further enhance the syneresis of the polyelectrolyte which was originally formed,
d) washing the gel body with water and subsequently impregnating it with a readily volatile, water-miscible solvent,
e) freeing the anhydrous gel body or gel bodies obtained as in d) from the readily volatile, water-miscible solvent,
f) burning out the organic constituents from the dry gel body or the dry gel bodies obtained as in e),
g) sintering the product obtained as in f).

A capillary frit is also described. Moreover, the invention describes the use of these materials as a catalyst or as a catalyst support, as a ceramic component for composite materials, as a reversible flow filter and as a slab-like sorbent for chromatography columns, as well as the use of a composite material, which is produced from a granular material of the ceramics which are described, as a dental material, particularly as a dental cement.

12 Claims, No Drawings

POROUS CERAMIC

This invention relates to a porous ceramic and to a process for producing it.

Highly porous ceramics are increasingly being used as filter systems, as implants in medical technology and as supports for catalysts. There are numerous processes for producing them, only two of which will be cited here:

The production from aerogels and the burning-out of previously admixed organic additives.

The areas of use of ceramics such as these depend on their chemical and thermal stability, on their permeability, on their specific surface and on the length of the diffusion paths to their active surface.

The materials are selected based on requirements imposed by their area of use and stability; their pore size, pore size distribution and pore shape are selected based on the requirements of permeability, diffusion path and surface area. The importance of these properties to the use of these ceramic substances is clear: good stability enables them to be used even with aggressive media and at high temperatures, whilst good permeability results in a low pressure drop during operation and thus facilitates low energy consumption; a high specific surface results in a high density of adsorption centres and/or reaction centres; short diffusion paths enable active centres to be reached by flows of material in reasonable timescales.

Unfortunately, only partial success has been achieved hitherto in optimising these four important properties simultaneously in order to obtain high stability, a low resistance to flow, a high specific surface and short diffusion paths. Good permeability cannot be achieved with randomly oriented powdered materials or random arrangements of materials which are subsequently sintered, because these are macroscopically isotropic and also exhibit a high resistance to flow (one known example of a sintered, randomly oriented powdered material is a glass frit which is fused into chemical apparatuses). Instead, macroscopically anisotropic arrangements of particles are required, and what is required in practice is therefore systems of tubes or capillaries which are open at both ends and which have aperture diameters of the same magnitude. However, it has hitherto only been possible to produce systems such as these with tube and/or capillary spacings which are large in absolute terms. The regions between the capillaries/tubes can only be reached via long diffusion paths. For this reason, a high specific internal surface of the wall material is incapable of having the desired effect, since it is only the edge regions thereof around the tubes/capillaries which can be reached by flows of substance within a reasonably short timescale.

Currently, ceramics through which capillaries or tubes pass can only be produced by extrusion methods. The smallest diameter which can thereby be achieved is 200 $\mu$m. The spacings between the capillaries/tubes are about 600 $\mu$m. commercially available. Even the patent and scientific literature contains no references to structures such as these.

It is only the document EP-A-0479553 that describes porous ceramics with a high porosity and a narrow pore size distribution which are obtained by preparing a dilute slurry of a ceramic starting material in a solution of a high molecular weight organic compound such as ammonium alginate, which can be converted into a gel by reaction with an acid or with tri- or polyvalent cations or by heating or cooling. The slurry is brought into contact with a liquid or with a gel in which the acid or the tri- or polyvalent cations are present, or is heated or cooled, in order to obtain a ceramic gel substance which is subsequently calcined. These porous ceramics exhibit improved resistance and mechanical strength and are thus suitable as high-temperature catalyst supports.

The underlying object of the present invention is therefore to provide a ceramic body with a high stability, a low resistance to flow, a high specific surface and short diffusion paths, as well as a process for the production thereof.

The present invention relates to a porous ceramic, which is produced by:

a) mixing an aqueous solution of a suitable ionotropically orientable polyanion, either with
   oxides, hydroxides or hydrated oxides, which are present in the form of a sol, of the metals Al, Zr, Ti and Nb,
   or with finely crystalline oxides, hydroxides or hydrated oxides, which are present in suspension, of these metals,
   or with finely crystalline tricalcium phosphate or apatite which are present in suspension, b) bringing the mixed sol obtained as in a) or the suspension obtained as in a) into contact with a solution of a salt of a di- or trivalent metal cation in order to produce an ionotropic gel body, solution of a salt of a di- or trivalent metal cation in order to produce an ionotropic gel body, c) compacting the gel body by introducing it into electrolyte solutions which further enhance the syneresis of the polyelectrolyte which was originally formed, d) washing the gel body with water and subsequently impregnating it with a readily volatile, water-miscible solvent, e) freeing the anhydrous gel body obtained as in d) from the readily volatile water-miscible solvent, f) burning out the organic constituents from the dry gel body obtained as in e), g) sintering the product obtained as in f).

Ionotropic gels are formed when a dilute aqueous solution of a suitable anionic polymer, for example a solution of a sodium alginate or of a sodium pectinate, or of sodium cellulose xanthogenate, sodium xanthate or sodium hyaluronate, is brought into contact with a solution of a divalent cation such as $Cu^{2+}$ or $Ca^{2+}$ or with a solution of a trivalent cation such as $Al^{3+}$ or $La^{3+}$. This is effected, for example, by adding the solution of the polyanion drop-wise to the solution of the metal cation or by adding the solution of the metal cation drop-wise to the solution of the polyanion, or by coating one solution with the other in the absence of convection. The proportion by weight of the polyanion in the sol can range between 0.25 and 5.0 percent by weight. Proportions by weight from 0.5 to 2.0 percent by weight are particularly suitable. The concentrations of the metal salt solutions are greater than $10^{-3}$ M and are less than the respective saturation concentration of the salt in water. Concentrations between $10^{-1}$ and 2 M are most suitable. After the formation of a membrane-like precipitate at the phase boundary between the two liquids, which is termed the primary membrane, oriented diffusion occurs of the low molecular weight electrolyte into the solution of the polymer. However, the precipitation which continues to occur at this location does not result in amorphous precipitate, but in a gel which is structured in three dimensions.

Regularly arranged capillaries are then formed, which are of practically identical size and which are circular in cross-section, the walls of which capillaries consist of the precipitated product and the lumina of which absorb the water evolved during precipitation. The stability of the gel is therefore based on the fact that the di- or trivalent cations crosslink the molecules of the polymer with each other and thus impart a certain mechanical strength to the capillary walls. The capillaries are all parallel to each other in the direction of diffusion of the electrolyte and can reach a length of a few centimeters. The arrangement of the capillaries is almost perfectly hexagonal and their radii slowly increase in the direction of diffusion of the metal cation, with a gradient of about 5%. The diameter of the capillaries of the gel can be adjusted within wide limits via the viscosity of the polyanion and the type of polyvalent cation. The lower limit which could be achieved hitherto was about 5 $\mu$m, and the upper limit was about 300 $\mu$m. If the gels are produced by coating the two solutions, their strength in most cases is sufficient to enable them to be cut—starting at the top—into slices, the smallest thickness of which is about ½ mm and maximum thickness of which can be about 2 cm. Due to the conicity of the capillaries, which are perpendicular to the slices, capillaries with arbitrarily predeterminable diameters can be obtained in the gel, depending on the depth of cut.

The alginate which is cited as an example here has been investigated particularly thoroughly with regard to its capacity for ionotropic orientation. Moreover, the capillary gels of this alginate are particularly regular. Under comparable experimental conditions, however, other substances, which were not investigated in such detail, also form patterns of capillaries which only exhibit qualitative differences from those of the alginate.

Amongst others, these latter substances include organic polyions such as pectinates, cellulose xanthogenates, xanthates, hyaluronates, chondroitin sulphates, salts of carboxymethyl cellulose, of carboxyl cellulose and of chitosan; they also include complexes of polyanions (symplexes) and polycations, and finally they also include inorganic substances such as vanadium pentoxide and mixed organic/ inorganic substances such as mercury sulphosalicylate. These substance are therefore all polyelectrolytes.

According to the invention, it is possible to use ionotropic capillary gels as template structures for the production of crack-free, porous ceramics, the geometric structure of which is completely identical to the corresponding structure of the gels. It is only the dimensions of the porous ceramic structures as a whole which are somewhat smaller than those of the gel, as a result of drying and sintering. At first glance, the external appearance of ceramics such as these is the same as that of porous sintered bodies made of glass. As distinct from the latter, however, the ceramic is not isotropic, but is highly anisotropic as a result of the capillaries. On a second glance, this can be recognised by the iridescent sheen of the ceramic surface, which is reminiscent of the appearance of facets.

The diameters of the capillaries of the ceramic have values between 1 and 200 $\mu$m, and the spacings between the capillaries are about the same size as the capillary diameter. The free surface of the ceramic, which is formed by the capillary apertures, amounts to about 50% of its total surface area, and there are about 50,000 capillaries per $cm^2$ of surface. The porosity or proportion of voids of the ceramic ranges between 75% and 85% of the total volume thereof.

The porosity of the ceramic can be analysed in greater detail by means of mercury porosimetry. It is found that a ceramic produced from alginate/boehmite mixed sols, for example, has a trimodal pore size distribution, whereas a ceramic obtained from suspended alumina has a bimodal distribution. In both these cases, the capillaries constitute the population of the largest pores and the interstices between the alumina particles of the pore walls constitute the population of the second largest pores. Moreover, when boehmite is used the spaces between the individual crystallites of boehmite constitute a third population, which is manifested as an additional internal porosity of the alumina particles in the capillary walls. The first population (capillaries) has a pore size maximum at about 10 $\mu$m, the second at about 130 nm, and the third at 58 nm.

Production of the ceramic necessitates that either a sol of a metal hydroxide or of a hydrated metal oxide is produced in the alginate sol or that a slurry of a finely crystalline metal oxide, metal hydroxide or hydrated metal oxide is admixed with the alginate sol.

The term "finely crystalline" denotes average particle sizes from 10 nm to 1 mm, preferably from 100 nm to 500 nm.

The formation of the ionotropic capillary gels from mixed sols proceeds exactly as does the formation thereof from unmodified sols, except that the inorganic component accumulates in the capillary walls. In the latter gel bodies, the density of the solid particles in the capillary walls is still so low that a ceramic produced therefrom does not yet possess the desired mechanical strength even after being subjected to all the other process steps. It is therefore necessary to subject the gel body to a shrinkage process, in order further to increase the particle density. For this purpose, the syneresis which occurred with the original formation of the gel has to be further enhanced, and additional proportions of the water which is bound in the gel have to be discharged in the capillary lumina. In order to achieve this, there are various practical options which are all theoretically based on the same principle. The osmotic pressure in the regions of the capillary walls has to be reduced, and the osmotic pressure in the lumina has to be increased. Increasing the pressure in the lumina does not necessitate further discussion; reducing the pressure in the regions of the capillary walls is effected by ion exchange. The polyvalent metal cations which were originally required for gel formation are replaced by more strongly bound ions, which in the best case are even more weakly hydrated. Amongst other type of ions, the latter can be protons, with the gel body being incubated in baths of hydrochloric acid of increasing concentrations, for example, in order to effect further compaction. In order to effect the exchange of metal ions, it is particularly effective if a solution of a poly- or oligo-electrolyte, the solid-state ions of which bear the opposite charge to the solid-state ions of the polyion which was originally formed, is introduced into the capillary lumina. In particular, oppositely charged, high molecular weight electrolytes are mutually precipitated to form precipitates of high density, which are insoluble in most solvents. These are termed "symplexes". If the polyion which was originally gel-forming is a polyanion, an alginate, for example, the ions which are suitable for symplex formation include all polycations, e.g. polyvinylamine, polyallylamine, polyvinylpyridine or polyethylene-imine cations, and also include polycations of biological origin such as chitosan; examples of suitable oligocations include pentaethylenehexamine or, again, biological substances such as protamines and histones. Charged oligomers and polymers which are suitable for symplex formation also include micelles of ionic surface-active agents.

For symplex formation also, it is advantageous to increase the concentrations of the precipitating polyions by adding the latter in portions.

During ion exchange, the gel bodies shrink in every dimension to about half their original linear dimensions, and ion exchange has to be carried out particularly carefully since the gel substances exhibit a pronounced tendency towards crack formation during shrinkage.

After ion exchange, the gel substances are subjected to a series of washing and dewatering steps in which water is displaced by a readily volatile organic, water-miscible solvent, e.g. acetone. This solvent is also removed after dewatering. Examples of processes which are suitable for this purpose include supercritical drying in carbon dioxide, pressing out the liquid with the aid of fine-pored earthenware slabs, or simply allowing the batch to stand in air under ambient conditions. After the solvent has been removed, a typical "green body" is formed. This is heated according to an appropriate temperature-time programme, whereupon the organic template structure is carbonized or burned. Finally, the finished ceramic is formed by sintering. The organic template substances are routinely burned out at 600° C. for two hours. The completion of burn-out in each case is indicated by the colour of the sample changing from black to white. Temperatures of 800° C. to 1400° C. are required for sintering the samples. The duration of firing ranges from two to ten hours. The temperature and duration of the firing operation are ultimately determined based on the magnitude of the specific surface of the ceramic and the mechanical performance thereof, and are re-determined from case to case depending on the requirements imposed on the final product.

The ceramic according to the invention can be produced in various geometric shapes, depending on the sphere of use thereof. The ceramics can be employed for particularly diverse uses if they are in the form of frits of defined geometry which can readily be incorporated in predetermined apparatuses or parts of apparatuses. Frits such as these are plate-shaped and can be produced in both round and polygonal form. Their thicknesses range from 2 to 4 mm. The edge lengths of polygonal plates are about 100 mm long, as are the diameters of round discs.

Another form of the ceramic consists of a granular material comprising predominantly spherical grains a few millimeters in diameter. This is obtained by the drop-wise addition of one of the two solutions involved to the other, followed by the appropriate further processing of the small spheres of gel which are thereby formed.

It is sometimes sufficient simply to comminute the ceramic mechanically and then to obtain various sieve fractions therefrom. It is important here that the particle dimensions remain significantly larger than the pore diameter, because each particle should contain a plurality of capillaries.

The capillary ceramic can be employed for diverse uses, particularly for the use of frits or granulated material as a catalyst or catalyst support. This applies in particular to ceramics comprising the oxides of Zr, Ti, Nb or of Al.

In the form of a frit, the ceramic can also be employed as a permeable sorbent for chromatographic purposes. A ceramic made of alumina is suitable for this purpose.

If the ceramic consists of apatite or tricalcium phosphate, it can be used in the surgical field as a porous template structure for the replacement/new formation of bone.

If the ceramic is comminuted in a suitable mill so that the resulting particles are no smaller than about 100 $\mu$m and thus still contain a number of intact capillaries, an inorganic material is available which can be processed together with organic polymers, for example acrylic resins, to form composite materials with interesting new properties, for use as dental fillings for example. If the porous capillary ceramic (optionally after covering the surface thereof with a coupling agent) is impregnated with monomers or oligomers of a polymerisable substance, the shrinkage which unavoidably occurs in the interior of the capillaries during polymerisation is particularly low. Consequently, dental fillings made of a composite material which contains a high proportion of capillary ceramic only exhibit a slight tendency to form cracks due to shrinkage between the dentine and the filling on curing.

The invention is explained in more detail by the examples given below.

EXAMPLE 1

A ceramic capillary frit produced from a mixed sol consisting of boehmite and sodium alginate.

In a first step, a boehmite sol is produced. The proportion by weight of boehmite in this sol is initially about 3%. In a second step, the boehmite sol is concentrated to a boehmite content of 16.5%. In a third step, one proportion by weight of the concentrated boehmite sol is mixed with four proportions by weight of a $6\times10^{-2}$ M solution of sodium sulphate. After homogenisation, one proportion by weight of this sulphate-containing suspension is introduced into one proportion by weight of a sodium alginate sol, which contains 2% by weight of sodium alginate, and is again homogenised therein. At this point, a fairly stable boehmite/alginate mixed sol is present.

The subsequent steps comprise: coating the mixed sol with 1 M $Cu(NO_3)_2$ in the absence of convection, allowing the gel to mature for 10 hours (i.e. forming the capillary structure), cutting gel slices, effecting ion exchange ($Cu^{2+}$ replaced by $2H^+$) by successively introducing the gel body into baths of increasing hydrochloric acid concentration, washing out the remaining acid with water and replacing the water by acetone, removing the acetone by suction through porous earthenware slabs, burning out the organic constituents of the green body at 600° C. for 2 hours, and sintering at 1400° C. for 2 hours to form the capillary frit. The ceramic body is cut to its final dimensions and is optionally lapped.

EXAMPLE 2

A ceramic capillary frit produced from a suspension of alumina in a sodium alginate sol.

A fine crystalline alumina powder with an average particle size of 350 nm is suspended in water. The proportion by weight of alumina in this suspension is 8%.

One proportion by weight of this suspension is then mixed with one proportion by weight of a sodium alginate sol (2% by weight). After homogenisation, further processing was effected corresponding to Example 1, starting with coating by a copper nitrate solution.

What is claimed is:

1. A porous ceramic, obtainable by:
   a) mixing an aqueous solution of a ionotropically orientable polyanion, either with
      oxides, hydroxides or hydrated oxides, which are present in the form of a sol, of a metal selected from the group consisting of Al, Zr, Ti, and Nb,
      or with finely divided crystalline oxides, hydroxides or hydrated oxides, which are present in suspension, of a metal selected from the group consisting of Al, Zr, Ti, and Nb,
      or with finely divided crystalline tricalcium phosphate or apatite which are present in suspension,
   b) bringing the mixed sol obtained as in a) or the suspension obtained as in a) into contact with a solution of a salt of a di- or trivalent metal cation in order to produce an ionotropic gel substance,
   c) compacting the gel substance by introducing it into electrolyte solutions which further enhance the syneresis of the polyelectrolyte which has originally formed, d) washing the gel substance with water and subsequently impregnating it with a volatile, water-miscible solvent, e) freeing the anhydrous gel substance or gel substances obtained as in d) from the volatile, water-miscible solvent, f) burning out the organic constituents from the dry gel substance or the dry gel substances obtained as in e), g) sintering the product obtained as in f).

2. The porous ceramic according to claim 1, characterized in that it is formed as a capillary frit and is obtainable by:

a) mixing an aqueous solution of a ionotropically orientable polyanion, either with
   oxides, hydroxides or hydrated oxides, which are present in the form of a sol, of a metal selected from the group consisting of Al, Zr, Ti, and Nb,
   or with finely divided crystalline oxides, hydroxides or hydrated oxides, which are present in suspension, of a metal selected from the group consisting of Al, Zr, Ti, and Nb,
   or with finely divided crystalline tricalcium phosphate or apatite which are present in suspension, b) coating the mixed sol obtained as in a) or the suspension obtained as in a) with a solution of a salt of a di- or trivalent cation in order to produce an ionotropic gel substance and cutting said gel substance into slices, c) compacting the gel substance by introducing it into electrolyte solutions which further enhance the syneresis of the polyelectrolyte which has originally formed, d) washing the gel substance with water and subsequently impregnating it with a volatile, water-miscible solvent, e) freeing the anhydrous gel slices obtained as in d) from the volatile, water-miscible solvent, f) burning out the organic constituents from the dry gel slices obtained as in e), g) sintering the product obtained as in f).

3. A process for producing a porous ceramic, characterized by the following steps:

a) mixing an aqueous solution of a suitable ionotropically orientable polyanion, either with
   oxides, hydroxides or hydrated oxides, which are present in the form of a sol, of a metal selected from the group consisting of Al, Zr, Ti, and Nb,
   or with finely divided crystalline oxides, hydroxides or hydrated oxides, which are present in suspension, of a metal selected from the group consisting of Al, Zr, Ti, and Nb,
   or with finely divided crystalline tricalcium phosphate or apatite which are present in suspension, b) bringing the mixed sol obtained as in a) or the suspension obtained as in a) into contact with a solution of a salt of a di- or trivalent metal cation in order to produce an ionotropic gel substance, c) compacting the gel substance by introducing it into electrolyte solutions which further enhance the syneresis of the polyelectrolyte which has originally formed, d) washing the gel substance with water and subsequently impregnating it with a volatile, water-miscible solvent, e) freeing the anhydrous gel substance or gel substances obtained as in d) from the volatile, water-miscible solvent, f) burning out the organic constituents from the dry gel substance or the dry gel substances obtained as in c), g) sintering the product obtained as in f).

4. The process according to claim 3 for producing a ceramic capillary frit, characterized by the following steps:

a) mixing an aqueous solution of a ionotropically orientable polyanion, either with
   oxides, hydroxides or hydrated oxides, which are present in the form of a sol, of a metal selected from the group consisting of Al, Zr, Ti, and Nb,
   or with finely divided crystalline oxides, hydroxides or hydrated oxides, which are present in suspension, of a metal selected from the group consisting of Al, Zr, Ti, and Nb,
   or with finely divided crystalline tricalcium phosphate or apatite which are present in suspension, b) coating the mixed sol obtained as in a) or the suspension obtained as in a) with a solution of a salt of a di- or trivalent cation in order to produce an ionotropic gel substance and cutting said gel substance into slices, c) compacting the gel substance by introducing it into electrolyte solutions which further enhance the syneresis of the polyelectrolyte which has originally formed, d) washing the gel substance with water and subsequently impregnating it with a volatile, water-miscible solvent, e) freeing the anhydrous gel slices obtained as in d) from the volatile, water-miscible solvent, f) burning out the organic constituents from the dry gel slices obtained as in e), g) sintering the product obtained as in f).

5. The porous ceramic according to claim 1, wherein the porous ceramic is suitable for use as a catalyst or catalyst support.

6. A composite material comprising a ceramic component comprising a granular ceramic material produced from the ceramic according to claim 1.

7. The composite material of claim 6, wherein the composite material further comprises a synthetic resin and optionally a coupling agent.

8. The composite material according to claim 7, wherein the composite material is suitable for use as a dental material.

9. The porous ceramic according to claim 2, wherein the porous ceramic is suitable for use as a catalyst, a catalyst support, a reversible flow filter or as a monolithic sorbent suitable for use in a chromatography column.

10. The composite material of claim 8, wherein the composite material is suitable for use as a dental cement.

11. A porous ceramic material comprising at least one ceramic material prepared from a sol or finely divided crystals of an oxide, hydroxide or hydrated oxide of Al, Zr, Ti, or Nb or from a suspension of finely divided crystalline tricalcium phosphate or apatite, wherein the porous ceramic material has a porous structure comprising coparallel capillaries which are arranged in a hexagonal array.

12. The porous ceramic material of claim 11, wherein the capillaries have a diameter of between about 1 and about 200 $\mu$m and adjacent capillaries are separated by a distance substantially equal to the capillary diameter.

* * * * *